L. L. MELTON.
MOTOR VEHICLE.
APPLICATION FILED JULY 9, 1917.
1,268,261.
Patented June 4, 1918.
2 SHEETS—SHEET 2.
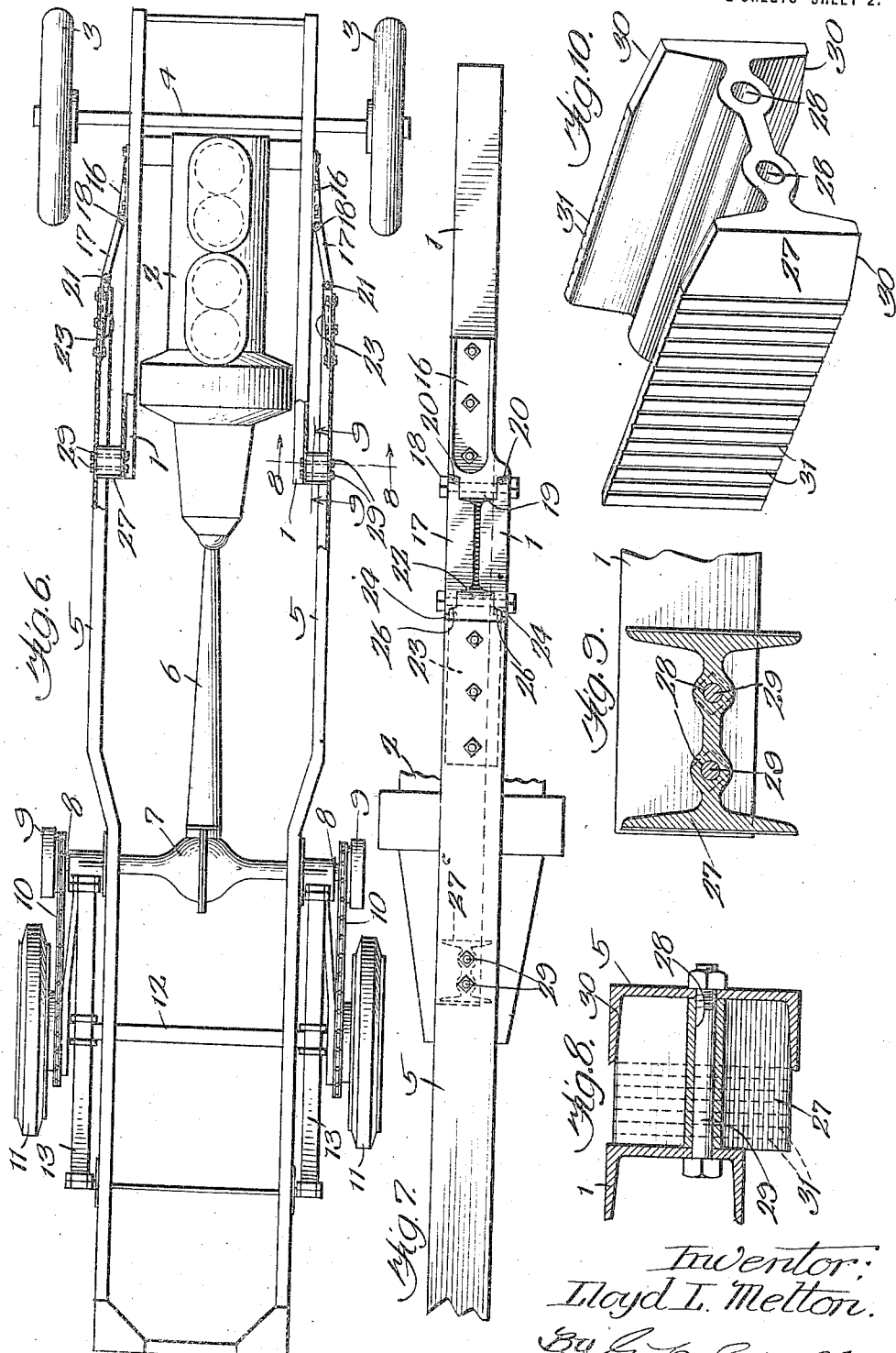

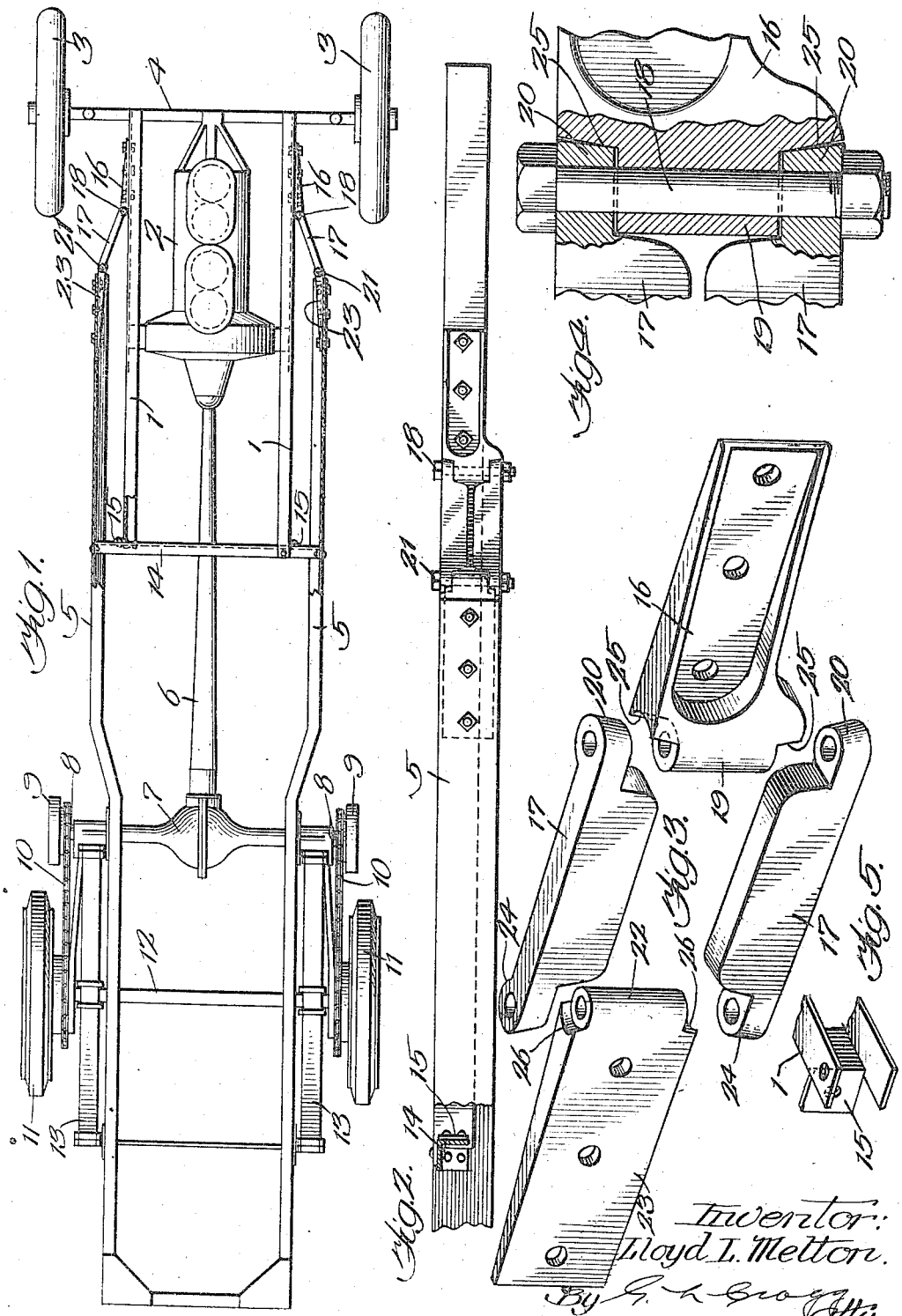

UNITED STATES PATENT OFFICE.

LLOYD L. MELTON, OF CHICAGO, ILLINOIS, ASSIGNOR, BY DIRECT AND MESNE ASSIGNMENTS, TO DEARBORN TRUCK CO., OF CHICAGO, ILLINOIS, A CORPORATION OF ILLINOIS.

MOTOR-VEHICLE.

1,268,261. Specification of Letters Patent. Patented June 4, 1918.

Application filed July 9, 1917. Serial No. 179,308.

*To all whom it may concern:*

Be it known that I, LLOYD L. MELTON, citizen of the United States, residing at Chicago, in the county of Cook and State of Illinois, have invented a certain new and useful Improvement in Motor-Vehicles, of which the following is a full, clear, concise, and exact description.

The invention relates to motor vehicles and has for its object the provision of improved means whereby portions of automobiles of one type may be employed in making motor driven vehicles of another type, such as trucks.

The invention relates to an attachment that is applicable to original chassis frames or retained portions of such frames whereby the power plants carried by the original frames may be employed. This attachment is inclusive of a supplemental frame designed to be supported upon rear vehicle driving wheels and having forward end portions that are relatively adjustable transversely of the supplemental frame, each forward end portion of the supplemental frame being preferably adjustable transversely of this frame.

The invention will be fully explained by reference to the accompanying drawings showing two embodiments thereof and in which Figure 1 illustrates the preferred form of the invention in plan as applied to a retained portion of an original chassis; Fig. 2 is a side view of the forward part of the structure shown in Fig. 1; Fig. 3 is a perspective view showing certain component parts at the forward end of one side of the supplemental frame in separated relation; Fig. 4 is a view of a part of the structure partially in section; Fig. 5 is a perspective view illustrating a portion of a joint shown in Fig. 1; Figs. 6 and 7 are views generally similar to Figs. 1 and 2 respectively, means whereby the rear ends of the retained portion of the chassis frame are attached to the supplemental frame being different from the means employed in Figs. 1 and 2; Fig. 8 is a view on line 8—8 of Fig. 6, on a larger scale; Fig. 9 is a view on line 9—9 of Fig. 6, on a larger scale; and Fig 10 is a perspective view of the block shown in Figs. 8 and 9.

Like parts are indicated by similar characters of reference throughout the different figures.

In Fig. 1 there is illustrated a part of an original chassis frame 1, varying in width in different makes of automobiles, an engine 2 of an original power plant supported by said chassis frame, and the steering vehicle wheels 3 mounted at the ends of the forward non-rotating axle 4 that is connected with the forward end of the frame 1 in any suitable or well known manner. The attachment of the invention is inclusive of the parts shown in addition to the parts 1, 2, 3 and 4. The attachable supplemental frame 5 carries or is connected with a longitudinal housing 6 and a transverse housing 7 which contain the shafting and the gearing whereby the engine 2 may drive the jack shaft 8 that is mainly within and projects from the housing 7, this jack shaft being preferably formed in sections that are coupled by differential gearing in accordance with common practice. This jack shaft carries brake drums 9 at its outer ends and sprocket pinions adjacent these drums over which pinions the sprocket chains 10 pass. These sprocket chains also engage sprocket wheels that are co-axial with and fixed with respect to the rear driving vehicle wheels 11. The rear portion of the frame 5 is desirably supported upon the non-rotating or dead axle 12 on the outer ends of which the vehicle wheels 11 turn, these wheels thus supporting the frame 5 which extends forwardly therefrom. Semi-elliptical springs 13 desirably intervene between the frame 5 and the dead axle 12 whereby this frame is yieldingly supported upon said dead axle. The frame 5 also carries a strut 14, constituting part of the same attachable unit with frame 5, which projects from side to side of the frame and is united at its ends with the side rails of the frame. Angle iron is desirably used in the formation of the strut 14 and the side and rear end rails of the supplemental frame 5. The ends of the vertical portion of the strut are turned in and riveted to the vertical web portions of the side rails of the frame 5, the ends of the strut 14 being interposed between the top and bottom flanges of said side rails. The rails of the original frame 1 are also made of channel iron. As indicated most clearly in Fig. 5, the web portions of the rear ends of the side rails of the frame 1 are lapped outwardly to form wings 15 which are anchored to the vertical portion of the strut 14. The forward ends of the side rails of the attachable supplemental frame 5 are in the nature of blocks or plates 16 that are adjustable transversely of the frames 1 and 5. The forward ends of the frame 5 are thus adjustable transversely of the frame with respect to each other and while each forward end of this frame is adjustable the invention is not to be limited to both ends being adjustable.

By making the forward ends of the frame 5 thus adjustable the space between them is adaptable to the width of the original frame 1 of an automobile, to which original frame the supplemental frame is to be attached in making a truck that is inclusive of the power plant belonging to the original frame and the unit that includes the supplemental frame. By this arrangement supplemental frames of standard construction are adaptable to original chassis frames that differ in width in the different makes of automobiles whereby the power plants and chassis portions of such automobiles may readily be employed in the formation of trucks. The power transmission intervening between the rear propelling vehicle wheels 11 and the power plant of the automobile that is to be converted is such as to produce the required torque or turning effort upon these propelling vehicle wheels. Ordinarily the purpose of the attachable or supplemental frame 5 is to increase the length and width of the original chassis frame 1 and the transmission mentioned is generally such as to increase the power with which the propelling wheels 11 are driven, as power plants of pleasure automobiles are usually geared too low for use in trucks.

In the preferred embodiment of the invention the frame 5 also includes frame sections 17 that are flexibly connected at their forward ends to the frame ends 16 and at their rear ends to the non-adjustable portions of the side rails of the frame 5. The flexible connection between each frame end 16 and the contiguous frame sections 17 is desirably in the nature of a hinge structure, there being a pintle bolt 18 passing through the pintle sleeve 19 provided upon the rear end of the frame end 16 and through the pintle sleeves 20 provided upon the forward ends of the contiguous frame sections 17. The rear ends of each pair of frame sections 17 also desirably have hinged connection with the adjacent forward end of the non-adjustable portion of the frame 5, this hinged connection being inclusive of a pintle bolt 21 passing through the pintle sleeve 22 provided upon the forward end of a hinge leaf 23 that is riveted to the adjacent forward end of the non-adjustable portion of the frame 5. This pintle bolt 21 also passes through the pintle sleeves 24 provided upon the rear ends of the contiguous frame sections 17.

In applying the supplemental frame 5 to the retained portion of the original frame 1 the strut 14, forming a part of the same attachable unit with the frame 5, is riveted to the frame 1 whereby the original and supplemental frames have their relation generally determined. After this the frame ends 16 are brought into engagement with the forward ends of the side rails of the original frame 1 and are similarly riveted thereto. The frame sections 17 are automatically positioned when the frame ends 16 are applied to the original frame 1. Contiguous hinge members 16, 17 are directly clamped to hold them in absolutely rigid relation and the contiguous hinge members 17 and 23 are similarly clamped to hold these latter in rigid relation. This clamping action is desirably effected by the pintle bolts 18 and 21. The clamp operated upon by the bolt 18 is desirably inclusive of the pintle sleeves 20 which are conically tapered at their forward portions to have engagement with tapering seats 25 upon the rear end of the corresponding hinge leaf 16. The pintle sleeves 20 do not taper as sharply as do the tapering seats 25 so that the tapering faces of the sleeves 20 and the seats 25 will be forcibly engaged when the bolt 18 is tightened. The clamp operated upon by each bolt 21 is desirably similar to the clamp operated upon by each bolt 18, the rear portions of the pintle sleeves 24 tapering and having engagement with the tapering seats 26 upon the forward end of the corresponding hinge leaf 23, the tapering faces of the pintle sleeves 24 tapering less than do the seats 26 whereby the bolt 21 will forcibly engage the pintle sleeves 24 with the seats 26.

The structure shown in Figs. 6 and 7 is generally similar to the construction shown in Figs. 1 to 4 inclusive and like parts are given similar characters of reference.

In the construction shown in Figs. 6 and 7 the strut 14 is dispensed with, this strut being replaced by two blocks 27 that are bolted between the side rails of the original frame 1 and the side rails of the supplemental frame 5. These blocks 27 are desirably made as illustrated in Figs. 8, 9 and 10, being in the form of short sections of I-beams whose web portions are enlarged to afford provision for passages 28 for receiving the stems of the bolts 29. The outer ends of these blocks 27 are desirably tapered as indicated at 30 to permit them to be interposed between the horizontal sides of the side rails of the frame 5. These blocks are desirably provided with equidistant spaced lines 31 along which the blocks may be cut transversely thereof to adjust the width of the blocks to suit the spaces that intervene between contiguous side rails of the frames 1 and 5 which would vary with different makes of pleasure automobiles.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. An attachment for forming a motor vehicle comprising propelling vehicle wheels; and a frame supported thereon and extending forwardly therefrom, this frame having side rails whose forward ends are both adjustable transversely of the frame and in hinged connection with the balance of the frame to render the frame adaptable for attachment to other frames of differing widths.

2. An attachment for forming a motor vehicle comprising propelling vehicle wheels; and a frame supported thereon and extending forwardly therefrom, this frame having side rails whose forward ends are both adjustable transversely of the frame and in hinged connection with the balance of the frame to render the frame adaptable for attachment to other frames of differing widths, the first aforesaid frame also having additional frame sections that intervene between the aforesaid frame ends and the balance of this frame and in hinged connection with the aforesaid frame ends and the balance of the frame.

3. An attachment for forming a motor vehicle comprising propelling vehicle wheels; a frame supported thereon and extending forwardly therefrom, this frame having side rails whose forward ends are both adjustable transversely of the frame and in hinged connection with the balance of the frame to render the frame adaptable for attachment to other frames of differing widths, the first aforesaid frame also having additional frame sections that intervene between the aforesaid frame ends and the balance of this frame and in hinged connection with the aforesaid frame ends and the balance of the frame; clamping means for holding these frame sections in rigid connection with the frame ends and the balance of the first aforesaid frame, said clamping means being inclusive of the pintles of the hinges that are in the form of clamping bolts; and clamping elements upon the parts united by said bolts and held in clamped engagement by said bolts.

4. An attachment for forming a motor vehicle comprising propelling vehicle wheels; and a frame supported thereon and extending forwardly therefrom, this frame having side rails whose forward ends are both adjustable transversely of the frame and in hinged and clamping connection with the balance of the frame to render the frame adaptable for attachment to other frames of differing widths.

5. An attachment for forming a motor vehicle comprising propelling vehicle wheels; and a frame supported thereon and extending forwardly therefrom, this frame having side rails whose forward ends are both adjustable transversely of the frame and in hinged connection with the balance of the frame to render the frame adaptable for attachment to other frames of differing widths, the first aforesaid frame also having additional frame sections that intervene between the aforesaid frame ends and the balance of this frame and in hinged and clamping connection with the aforesaid frame ends and the balance of the frame.

In witness whereof, I hereunto subscribe my name this 5th day of July, A. D., 1917.

LLOYD L. MELTON.

Witnesses:
G. L. CRAGG,
HARRY R. THOMAS.

Copies of this patent may be obtained for five cents each, by addressing the "Commissioner of Patents, Washington, D. C."